(12) United States Patent
DeLuca et al.

(10) Patent No.: US 11,556,740 B2
(45) Date of Patent: Jan. 17, 2023

(54) SENSOR TRIGGERED SOUND CLIP CAPTURING FOR MACHINE LEARNING

(71) Applicant: INTERNATIONAL BUSINESS MACHINES CORPORATION, Armonk, NY (US)

(72) Inventors: Lisa Seacat DeLuca, Baltimore, MD (US); David Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 16/704,429

(22) Filed: Dec. 5, 2019

(65) Prior Publication Data

US 2021/0174140 A1    Jun. 10, 2021

(51) Int. Cl.
*G06K 9/62* (2022.01)
*G06N 20/00* (2019.01)
*G16Y 40/35* (2020.01)
*G16Y 20/10* (2020.01)

(52) U.S. Cl.
CPC ......... *G06K 9/6256* (2013.01); *G06K 9/6221* (2013.01); *G06N 20/00* (2019.01); *G16Y 20/10* (2020.01); *G16Y 40/35* (2020.01)

(58) Field of Classification Search
None
See application file for complete search history.

(56) References Cited

U.S. PATENT DOCUMENTS

| | | | | |
|---|---|---|---|---|
| 5,853,005 A * | 12/1998 | Scanlon | ................. | A61B 5/113 381/166 |
| 9,979,724 B2 * | 5/2018 | Tunnell | ................... | H04W 4/70 |
| 2019/0042881 A1 * | 2/2019 | Lopatka | ................. | G10L 25/24 |
| 2019/0043489 A1 * | 2/2019 | Lopatka | ............... | G06N 3/0454 |
| 2021/0174140 A1 * | 6/2021 | DeLuca | ............... | G06K 9/6256 |

OTHER PUBLICATIONS

Mell et al., "The NIST Definition of Cloud Computing", National Institute of Standards and Technology, Special Publication 800-145, Sep. 2011, 7 pages.

(Continued)

*Primary Examiner* — Tahmina N Ansari
(74) *Attorney, Agent, or Firm* — Steven M. Bouknight (57) ABSTRACT

A method for automatically training a machine learning system to detect and identify a sensor triggering event associated with an internet of things (IoT) device is provided. The method may include capturing sensor data and capturing sound clips associated with the IoT device. The method may further include identifying the sensor triggering event associated with the IoT device. The method may further include sending an alert of the identified sensor triggering event. The method may also include correlating the captured sensor data, the captured sound clips, and the identified sensor triggering event. The method may further include identifying a second sensor triggering event by determining similarities between the correlated data associated with the identified sensor triggering event and additional sensor and sound data that is captured based on the second sensor triggering event.

20 Claims, 5 Drawing Sheets

(56) References Cited

OTHER PUBLICATIONS

Navarro et al., "Real-Time Distributed Architecture for Remote Acoustic Elderiy Monitoring in Residential-Scale Ambient Assisted Living Scenarios", 4th International Electronic Conference on Sensors and Applications, Aug. 1, 2018, 22 pages, Mdpi.com, DOI: 10.3390/s1808249.

Pan, et al., "Cognitive Acoustic Analytics Service for Internet of Things", 2017 IEEE International Conference on Cognitive Computing (ICCC), Accessed on Nov. 26, 2019, pp. 96-103, Retrieved from the Internet: <URL: https://ieeexplore.ieee.org/document/8029228>.

\* cited by examiner

SENSOR TRIGGERED SOUND CLIP CAPTURING FOR MACHINE LEARNING

BACKGROUND

The present invention relates generally to the field of computing, and more specifically, to detecting and correlating sensor and sound clip data for identifying events associated with a device.

Generally, machine learning systems using sensors and signal data is increasing as hardware becomes smaller and sensors are getting cheaper, in turn making internet of things (IoT) devices widely available for a variety of applications ranging from predictive maintenance to user behavior monitoring. For example, one can build richer analytics by teaching a machine to detect and classify events happening in real-time, at the edge, using an inexpensive microcontroller for processing. While the use of sensor technology has long affected how manufacturers, industrial organizations and utilities operate, the addition of IoT to sensors has expanded their impact and use cases, bringing more connectivity and analytics to different processes. Sensors for use in IoT may be purposed for many different forms of measurement, providing a mechanism that links desired observations from the field to an application. Thus, in an IoT ecosystem/environment, two things are very common: the Internet (or some type of application with Internet capabilities) and physical devices that include the sensors themselves and/or actuators. Furthermore, different types of applications typically require different types of sensors to collect data from the environment.

SUMMARY

A method for automatically training a machine learning system to detect and identify a sensor triggering event associated with an internet of things (IoT) device is provided. The method may include, in response to a first sensor triggering event, using one or more sensors associated with a sensor analysis unit to capture sensor data and using an acoustic detection device to capture one or more sound clips associated with the IoT device. The method may further include, based on the captured sensor data and the captured one or more sound clips, identifying the first sensor triggering event associated with the IoT device. The method may further include sending an alert comprising a notification of the first identified sensor triggering event to one or more computing devices associated with a user of the IoT device. The method may also include correlating and storing the captured sensor data, the captured one or more sound clips, and the first identified sensor triggering event and providing the correlated and stored data as training data to one or more computing systems.

A computer system for automatically training a machine learning system to detect and identify a sensor triggering event associated with an internet of things (IoT) device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include, in response to a first sensor triggering event, using one or more sensors associated with a sensor analysis unit to capture sensor data and using an acoustic detection device to capture one or more sound clips associated with the IoT device. The method may further include, based on the captured sensor data and the captured one or more sound clips, identifying the first sensor triggering event associated with the IoT device. The method may further include sending an alert comprising a notification of the first identified sensor triggering event to one or more computing devices associated with a user of the IoT device. The method may also include correlating and storing the captured sensor data, the captured one or more sound clips, and the first identified sensor triggering event and providing the correlated and stored data as training data to one or more computing systems.

A computer program product for automatically training a machine learning system to detect and identify a sensor triggering event associated with an internet of things (IoT) device is provided. The computer program product may include one or more computer-readable storage devices and program instructions stored on at least one of the one or more tangible storage devices, the program instructions executable by a processor. The computer program product may include program instructions to, The computer program product may include program instructions to, in response to a first sensor triggering event, use one or more sensors associated with a sensor analysis unit to capture sensor data and use an acoustic detection device to capture one or more sound clips associated with the IoT device. The computer program product may further include program instructions to, based on the captured sensor data and the captured one or more sound clips, identify the first sensor triggering event associated with the IoT device. The computer program product may include program instructions to send an alert comprising a notification of the first identified sensor triggering event to one or more computing devices associated with a user of the IoT device. The computer program product may include program instructions to correlate and store the captured sensor data, the captured one or more sound clips, and the first identified sensor triggering event and providing the correlated and stored data as training data to one or more computing systems.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to detecting and correlating sensor and sound clip data for identifying events associated with a device. The following described exemplary embodiments provide a system, method and program product for automatically and cognitively capturing, identifying, and correlating sound and sensor data associated with an IoT device in response to one or more sensor triggering events. Specifically, the present embodiment has the capacity to improve the technical field associated with diagnosing an IoT device by using the captured sensor and sound data as training data for one or more machine learning systems in order to better analyze and identify sensor triggering events. More specifically, the system, method and program product may automatically capture sensor data and sound based on a sensor triggering event, cognitively diagnose the sensor triggering event based on the captured sensor and sound data, and correlate the data associated with the captured sound, the captured sensor data, and the sensor triggering event to be provided as training data to a machine learning system.

As previously described with respect to sensors and machine learning systems, sensors for use in IoT may be purposed for many different forms of detection, where different types of applications may typically require different types of sensors to detect and collect data from the IoT device and/or from an environment. As previously described, one can build richer analytics by using sensors and teaching a machine to detect and classify events happening in real-time, at the edge. However, when it comes to edge computing and IoT, certain aspects of integrating machine learning with sound and acoustic devices have been largely unexplored. Specifically, as the popularity of devices such as smart phones, smart home devices, and smart vehicle devices have continued to grow, many capabilities of cognitively capturing sound associated with these IoT device and applying machine learning techniques to the captured sound and other data to diagnose a problem with the IoT device have been largely unexplored. More specifically, one issue in evaluating sound associated with an IoT device is the training of machine learning systems, and more particularly, capturing enough sound clips to teach a machine learning system to identify what is normal versus abnormal for an IoT device. Furthermore, in some cases, certain IoT events of interest may occur so infrequently that it is difficult to capture relevant sound for use as training data for the machine learning systems. Additionally, in the case where some training data is supplied to a machine learning system, such systems often fail to add and update the training data and the system corpus in order to take advantage of the cognitive values of sound machine learning over time.

As such, it may be advantageous, among other things, to provide a method, computer system, and computer program product for automatically detecting and identifying a sensor triggering event associated with an IoT device by capturing sensor data and sound based on the sensor triggering event, cognitively diagnosing the sensor triggering event based on the captured sensor and sound data, and correlating the data associated with the captured sound, the sensor data, and the sensor triggering event to provide the correlated data as training data to a machine learning system. Specifically, the method, computer system, and computer program product may receive one or more rules that governs/controls event collection by a sensor analysis unit and an acoustic detection device, whereby event collection includes capturing sensor data and sound associated with an IoT device. Then, based on the received rules, the method, computer system, and computer program product may capture sensor data and one or more sound clips associated with the IoT device in response to a sensor triggering event. Thereafter, based on the captured sensor data and the captured one or more sound clips, the method, computer system, and computer program product may diagnose and identify the sensor triggering event associated with the IoT device. Furthermore, the method, computer system, and computer program product may correlate the captured sensor data and the captured sound clips with the identified sensor triggering event and provide the correlated data as training data for a machine learning system (whereby the machine learning system may be associated with the computer 102 and/or another computing device, and/or may be a database that includes).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
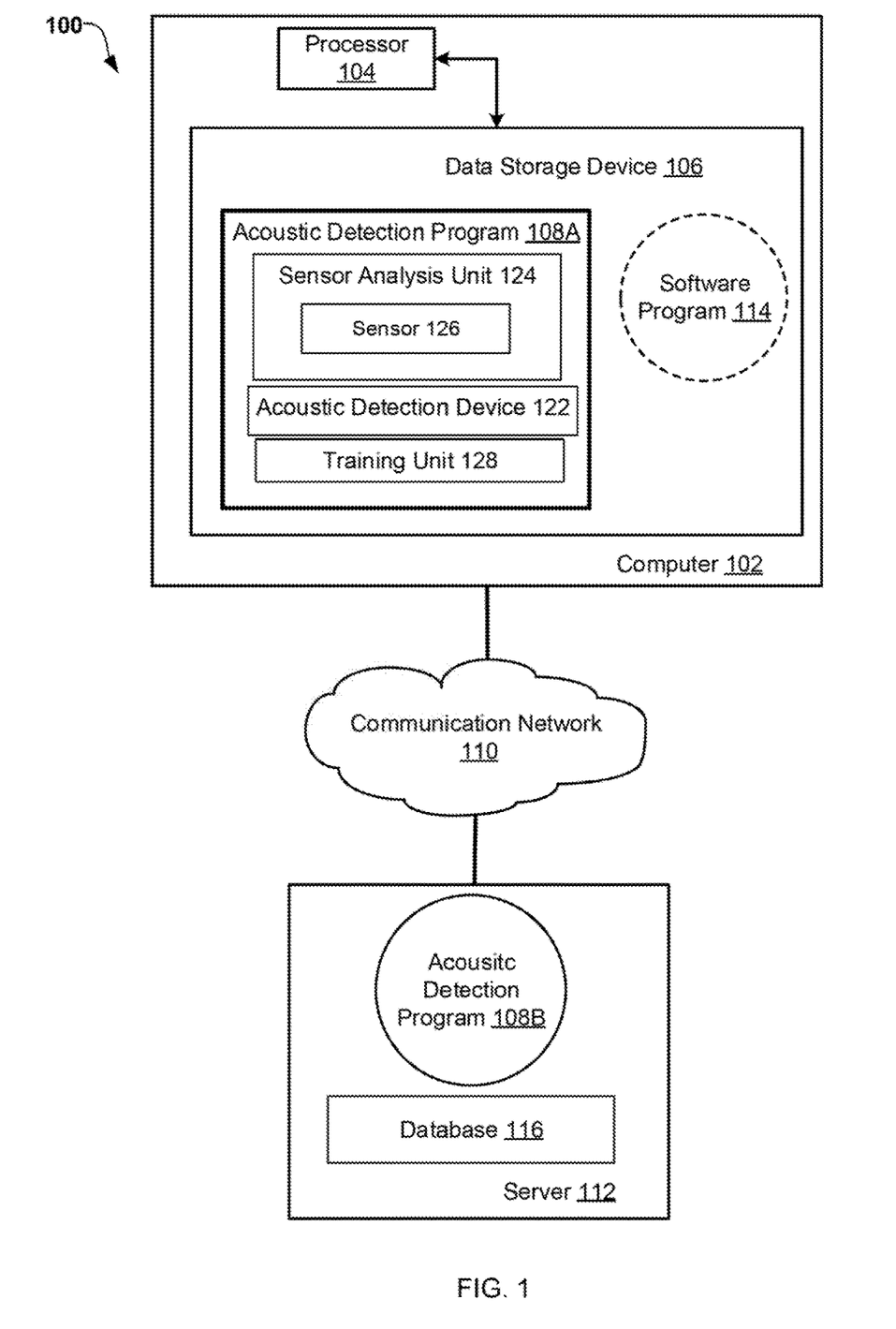
FIG. 1 illustrates a networked computer environment according to one embodiment.

Referring now to FIG. 1, an exemplary networked computer environment 100 in accordance with one embodiment is depicted. The networked computer environment 100 may include a computer 102 with a processor 104 and a data storage device 106 that is enabled to run a software program 114 and an acoustic detection program 108A. The client computer 102 may be an IoT device and/or a computer integrated with an IoT device. The software program 114 may be an application program such as an internet browser and/or one or more apps and programs running on the client computer 102. The acoustic detection program 108A may communicate with the software program 114. Furthermore, the acoustic detection program 108A may include one or more sensor analysis units 124 that further includes one or more sensors 126 that may capture data from the IoT device 102 such as sensor and other data (including user data), and/or capture data from the environment surrounding the IoT device 102. The acoustic detection program 108A may also include one or more acoustic detection devices 122 for capturing sound associated with the IoT device 102 and/or capturing sound with the environment surrounding the IoT device 102. Specifically, the acoustic detection device 122 may use a device (such as a microphone or a smart computing device) for capturing sound that may communicate with the sensor analysis unit 126. The sensor analysis unit 126 may communicate with the acoustic detection device 122. Furthermore, the sensor analysis unit 126 may be used to interpret one or more sensor triggering events and store the captured sensor data as well as the captured sound associated with the one or more sensor triggering events. Additionally, the acoustic detection program 108A may include a training unit 128 for diagnosing/assessing the one or more sensor triggering events and for correlating the captured sound, the captured sensor data, and the associated sensor triggering event to aid in identifying future sensor triggering events. According to one embodiment, the training unit 128 may include a database and one or more machine learning algorithms. The networked computer environment 100 may also include a server 112 that is enabled to run an acoustic detection program 108B and the communication network 110. The networked computer environment 100 may include a plurality of computers 102 and servers 112, only one of which is shown for illustrative brevity. For example, the plurality of computers 102 may include a plurality of interconnected devices, such as a mobile phone, tablet, and laptop, associated with one or more users.

According to at least one implementation, the present embodiment may also include a database 116, which may be running on server 112 and may be used to store data associated with the one or more sensor triggering events, the sensors 126, the sensor analysis unit 124, the acoustic detection device 124, and the training unit 128. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the acoustic detection program 108A, 108B may interact with a database 116 that may be embedded in various storage devices, such as, but not limited to, a mobile device 102, a networked server 112, or a cloud storage service.

According to the present embodiment, a program, such as an acoustic detection program 108A and 108B may run on the client computer 102 and/or on the server computer 112 via a communications network 110. The acoustic detection program 108A, 108B may capture one or more sound clips and sensor data that is based on one or more sensor triggering events (whereby the events may functional device operations) that are associated with the client computer 102 (such as an IoT device) by using the acoustic detection device 122 and sensors 126 and one or more received rules that govern event collection by the sensor analysis unit 124 and the acoustic detection device 122. Thereafter, based on the captured sensor data and the captured one or more sound clips, the acoustic detection program 108A, 108B may diagnose and identify the sensor triggering event associated with the IoT device. Furthermore, the acoustic detection program 108A, 108B may correlate the captured sensor data and the captured sound clips with the identified sensor triggering event and provide the correlated data as training data for a machine learning system, which may be associated with the training unit 128, for evaluating and identifying future sensor triggering events.

Figure 2:
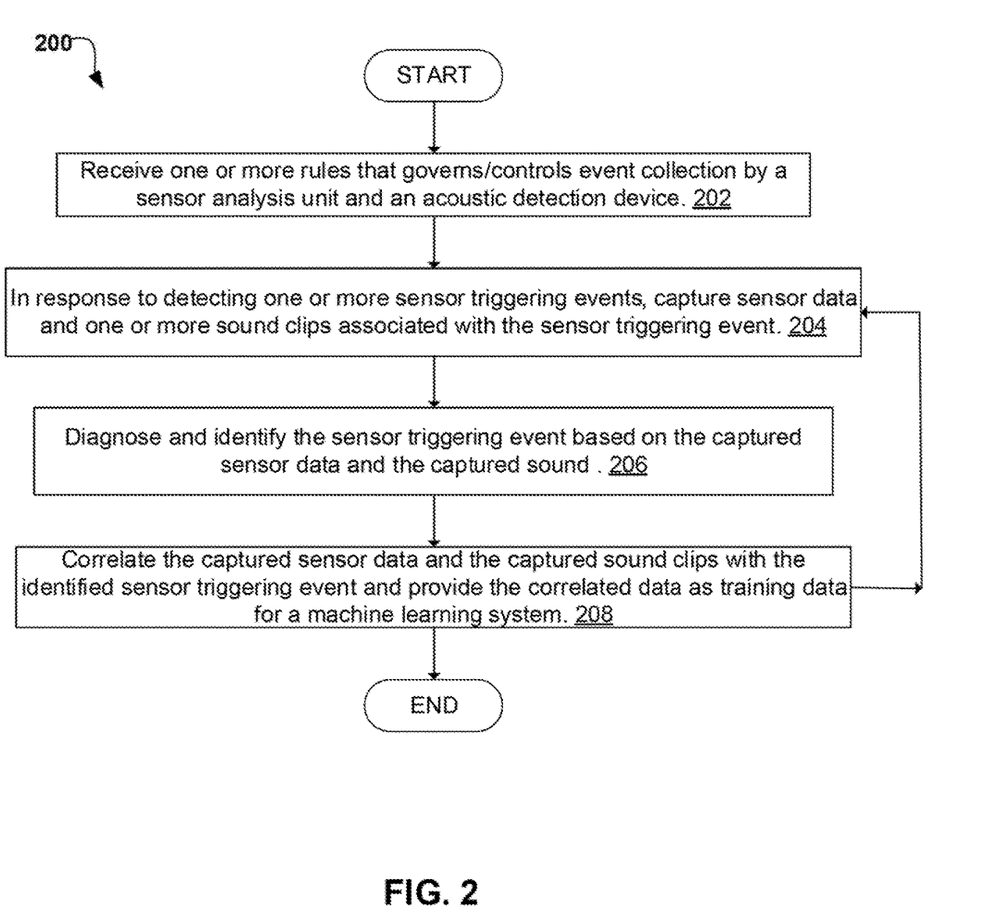
FIG. 2 is an operational flowchart illustrating the steps carried out by a program for automatically training a machine learning system to detect and identify a sensor triggering event associated with an internet of things (IoT) device according to one embodiment.

Referring now to FIG. 2, an operational flowchart 200 illustrating the steps carried out by a program for automatically and cognitively capturing sound based on a sensor triggering event and correlating the captured sound with one or more sensors and sensor data to cognitively provide the correlated data as training data to an acoustic machine learning system according to one embodiment is depicted. Specifically, beginning at step 202, the acoustic detection program 108A, 108B may receive one or more rules that governs/controls event collection by a sensor analysis unit 124 and an acoustic detection device 122, whereby event collection includes capturing sensor data and sound associated with an IoT device. More specifically, the acoustic detection program 108A, 108B may use the one or more rules to determine, for example, when and how long to collect sensor data associated with a sensor 126 and to collect sound data associated with an acoustic detection device 126 in response to a sensor triggering event. For example, and as previously described in FIG. 1, the acoustic detection program 108A, 108B may run on a client computer 102 (FIG. 1), which may be an IoT device such as a vehicle, home appliance, or smart device. Furthermore, the acoustic detection program 108A, 108B may include a sensor analysis unit 124 and one or more sensors 126 that may be triggered based on an event that the sensor 126 is designed to detect, and the acoustic detection program 108A may also include an acoustic detection device 122 that may also be triggered based on the sensor 126 and/or based on a sound detected by the acoustic detection device 122. Specifically, for example, in the case of an IoT device 102 such as a car vehicle, different types of sensors 126 may be deployed throughout the car vehicle to detect events such as tire pressure is low, door is unlocked, oil needs changing, battery is low, etc. Furthermore, one or more acoustic detection devices 122 may also be deployed throughout the car vehicle. The acoustic detection program 108A, 108B may use the sensors to detect the sensor triggering event, use the sensor analysis unit 124 to interpret the sensor triggering event, use the acoustic detection device 122 to capture one or more sound clips associated with the sensor triggering event, and use the sensor analysis unit 124 to capture the sensor data associated with the sensors and store the sensor data as well as the sound captured by the acoustic detection device 122.

As such, the acoustic detection program 108A, 108B may receive rules that govern/control the sensor analysis unit 124 for capturing sensor data and for capturing one or more sound clips based on sensor triggering events. For example, the acoustic detection program 108A, 108B may receive rules that govern/control the sensor analysis unit 124 (and the acoustic detection device 122) whereby the rules may, for example, include rules to: generally capture sound associated with a device 102 in response to a sensor triggering event associated with one or more specific types of sensors (ex. capture sound based on a sensor detecting when a car radio is turned on), to capture sound from the device 102 in intervals (ex. capture sound every 5 minutes, 20 minutes, an hour, etc.), capture sound in response to specific types of events (ex. capture sound only in response to an abnormal reading of a sensor and/or critical event associated with a sensor such as engine failure), capture sound for a certain length of time (ex. capture sound for the device for 10 seconds every 1 hour in response to an event triggering sensor X), to capture sound for a certain length of time based on a determined severity of the sensor triggering event and/or based on the particular sensor (ex. for normal/non-critical events capture sound for 10 seconds, for abnormal/critical events capture sound for 1 minute or longer), and to capture a threshold number of sound clips from a device 102 in a given day or within a certain amount of time (ex. capture no more than 10 sound clips within a 24-hour period based the type of sensor triggering event).

According to one embodiment, the acoustic detection program 108A, 108B may also preconfigure the sensor analysis unit 124 and the acoustic detection device 122 with rules that determine what is an abnormal/critical event versus what is a normal/non-critical event. For example, the acoustic detection program 108A, 108B may assign an event such as an engine failure or a need for an oil change as a critical event and may assign an event such as an unlocked car or a detected window being rolled down as a non-critical event. According to one embodiment, the acoustic detection program 108A, 108B may also receive rules governing how much sensor data to collect in response to different types of sensor triggering events. For example, the acoustic detection program 108A, 108B may receive a rule to capture sensor data from all sensors in response to an abnormal/critical reading of one or more sensors, or a rule to capture sensor data from specific sensors 126 in response to an abnormal/critical reading and/or in response to specific types of sensor triggering events.

Thereafter, at 204, in response to detecting one or more sensor triggering events, the acoustic detection program 108A, 108B may capture sensor data and one or more sound clips associated with the sensor triggering event. More specifically, using the one or more sensors 126 as well as the acoustic detection device 122 and the sensor analysis unit 124, the acoustic detection program 108A, 108B may capture sound and sensor data associated with a device 102 according to the received rules that are associated with the detected sensor triggering event. For example, the acoustic detection program 108A, 108B may receive rules that govern the acoustic detection device 122 whereby the rules may include a rule to generally capture sound for a length of 10 seconds from the car vehicle 102 in response to a sensor triggering event based on one or more specific types of sensors 126, as well as a rule to capture sound for a certain length of time based on the determined severity of the sensor triggering event—i.e. for normal/non-critical events capture sound for 10 seconds, for abnormal/critical events capture sound for 1 minute or longer. As such, the acoustic detection program 108A, 108B may use the acoustic detection device 122 to generally capture sound for 10 seconds based on a sensor triggering event that is determined to be normal (whereby the sensor analysis unit 124 may make this determination in real-time), such as capturing 10 seconds of sound from a sensor 126 that is used to detect when the car vehicle speed is adjusted, capturing 10 seconds of sound from a sensor 126 that is used to detect when the brakes are initiated, capturing 10 seconds of sound from a sensor 126 that is used to detect when the windows are rolled down, and capturing 10 seconds of sound from a sensor 126 that is used to detect when the car radio is turned on.

However, for example, in response to the car vehicle hitting a pothole, sensors 126 associated with a tire/wheel and axle may have an abnormal reading, and the acoustic detection program 108A, 108B may detect the abnormal reading and determine that the abnormality to the wheel and axle may be a critical event. Furthermore, the car vehicle may make an abnormal clinking sound. As such, based on the received rules, the determination that the sensor triggering event is an abnormal event, and the detection of an abnormal sound, the acoustic detection program 108A, 108B may use one or more acoustic detection devices 122 to record/capture sound from the car vehicle for 1 minute or longer, and in turn, may capture the clinking sound that is made by the car vehicle 102. Furthermore, the acoustic detection program 108A, 108B may capture sensor data associated with one or more sensors 126 in response to the detected sensor triggering event. Specifically, and as previously described at step 202, the acoustic detection program 108A, 108B may use one or more specific sensors 126 to detect sensor triggering events that are associated with the one or more specific sensors 126. For example, in the case of a car vehicle hitting a pothole, sensors 126 that are associated with the wheel and axle may have an abnormal reading, and the acoustic detection program 108A, 108B may detect the abnormal reading as well as use the sensor analysis unit 124 to capture data associated with the abnormal reading. More specifically, for example, the acoustic detection program 108A, 108B may capture sensor data such as the tire pressure associated with the wheel and/or capturing the axle measurements associated with the axle.

Furthermore, the acoustic detection program 108A, 108B may capture sensor data associated with one or more sensors 126 that may not have been used to detect the sensor triggering event. For example, and as previously described, in the case of a car vehicle hitting a pothole, sensors 126 that are associated with the wheel and axle may have an abnormal reading and the acoustic detection program 108A, 108B may capture sensor data associated with those one or more sensors 126. Additionally, the acoustic detection program 108A, 108B may capture sensor data associated with other sensors such as those that may be used to detect the seat position of a passenger, the speed of the vehicle, the oil pressure, the battery life, the power drawn by the motor (i.e. RPMs), the vehicle's GPS location, etc. In turn, the acoustic detection program 108A, 108B may capture sensor data from multiple sensors to aid in identifying the sensor triggering event as well as for correlating more sensor data with the captured sound. Specifically, and as will be discussed, the acoustic detection program 108A, 108B may use the captured sensor data to find correlations between the sensors that detected the sensor triggering event as well as the other sensors that are seemingly unrelated to the sensor triggering event but may have an impact on the cause and/or may be affected by the sensor triggering event. Again, as previously described at 202, the acoustic detection program 108A, 108B may receive rules governing how much sensor data to collect in response to different types of sensor triggering events. For example, the acoustic detection program 108A, 108B may receive a rule to capture sensor data from all sensors in response to an abnormal/critical reading of one or more sensors, or a rule to capture sensor data from specific sensors 126 in response to an abnormal/critical reading and/or in response to specific types of sensor triggering events. According to one embodiment, the acoustic detection program 108A, 108B may use the sensor analysis unit 124 to store the captured sensor data as well as the captured one or more sound clips associated with the sensor triggering event. Specifically, according to one embodiment, the stored sensor and sound data may include one or more audio files that include the captured sound, metadata associated with the sensors and sound, and/or natural language reports on the status of the sensors and sound before, during, and following the sensor triggering event.

Also, according to one embodiment, the acoustic detection program 108A, 108B may also capture sound that includes a voice clip from a user and may interpret the voice clip using machine learning techniques. For example, using an in-vehicle microphone associated with an in-vehicle sound system or using one or more acoustic detection devices 122, the acoustic detection program 108A, 108B may capture a user saying, "Watson, something sounds wrong with my engine," and in response, the acoustic detection program 108A, 108B may use the machine learning techniques to determine that there is a problem with the car and thereby capture sound and sensor data associated with the car vehicle and/or capture sound and sensor specifically with the engine. Also, according to one embodiment, the acoustic detection program 108A, 108B may audibly interact with and present a user with questions (i.e. yes/no, true/false) to aid in capturing sound identifying the sensor triggering event. For example, via an acoustic detection device 122, the acoustic detection program 108A, 108B may audibly present a question such as, "Do you detect a problem with your engine, yes or no," whereby the acoustic detection program 108A, 108B may capture sound in response to a user saying "yes."

Next, at 206, the acoustic detection program 108A, 108B may diagnose and identify the sensor triggering event based on the captured sensor data associated with the one or more sensors 126 and based on the captured sound by the acoustic detection device 122. Specifically, according to one embodiment, the acoustic detection program 108A, 108B may identify the sensor triggering event by first transmitting the captured sensor data and the one or more captured sound clips from the sensor analysis unit 124 to the training unit 128 for analysis. As previously described in FIG. 1, the training unit 128 may be used for identifying the sensor triggering event and for correlating the captured sensor data and the captured sound with the sensor triggering event. According to one embodiment, the acoustic detection program 108A, 108B may transmit the captured sensor data and the captured sound also based on received rules associated with the sensor analysis unit 124. As previously described at 202, the acoustic detection program 108A, 108B may receive rules for capturing sensor data and sound. Additionally, the acoustic detection program 108A, 108B may receive rules for transmitting the captured sensor data and the captured sound to the training unit 128. For example, the acoustic detection program 108A, 108B may receive one or more rules that include transferring the one or more captured sound clips by batching a specified number of captured sound clips that may be associated with one or more sensor triggering events (ex. a threshold number of 10 sound clips may be batched, and/or a threshold number of sound clips that together totals no more than 20 mins may be batched), transferring the captured sensor data only when connected to WiFi or a 3G network, transferring the captured sensor data and the captured sound that is only associated with determined abnormal sensor triggering events. and transferring the captured sensor data and the captured sound based on the car vehicle's GPS location (ex. only transferring data when the vehicle is determined to be at a home location).

Thereafter, the acoustic detection program 108A, 108B may diagnose and identify the sensor triggering event by using one or more machine learning algorithms/techniques (ex. regression, classification, clustering, anomaly detection) and acoustic machine learning techniques (ex. audio fingerprinting, audio classification, audio segmentation) associated with the training unit 128 to analyze and compare the transferred sensor data and sound data to stored sensor data and sound data that may be associated with a database 116 and/or to online sensor and sound data that may be found online using a software program 114. Specifically, according to one embodiment, the acoustic detection program 108A, 108B may maintain a system corpus (i.e. database 116) that includes previously captured sensor and sound data from previously detected and analyzed sensor triggering events, and/or a database comprising pre-identified events based on pre-identified sound sensor data. Furthermore, the acoustic detection program 108A, 108B may communicate with a software program 114 such as a website and/or app that may be used to compare and associate the captured sensor and sound data to online entries/records of sensor and sound data to help identify the sensor triggering event.

For example, based on a rule to transfer sensor data only associated with abnormal events, the acoustic detection program 108A, 108B may transfer the captured sensor and sound data associated with the sensor triggering event that caused abnormal readings by one or more sensors 126 associated with the wheel and axle of a car vehicle, whereby the captured sound data may include a 1 minute audio file of the clinging sound caused by the abnormal event and the captured sensor data may include metadata and status data associated with multiple sensors that detected event as well as those that did not detect the event.

Thereafter, using the one or more machine learning algorithms and acoustic machine learning techniques, the acoustic detection program 108A, 108B may use the training unit 128 to analyze, compare, and associate the captured sensor and sound data with stored and online sensor and sound data. Specifically, for example, the acoustic detection program 108A, 108B may use the acoustic machine learning techniques to compare sound attributes and determine similarities between the captured sound attributes with sound attributes that are stored and online. Also, for example, the acoustic detection program 108A, 108B may use machine learning techniques to compare and associate the captured sensor data with stored sensor data and online sensor data, whereby the comparing may include comparing sensor readings and comparing metadata associated with the sensor data. According to one embodiment, the acoustic detection program 108A, 108B may determine that the captured sound and sensor data has a certain degree of similarity to stored and/or online sound and sensor data that is specifically associated with a stored and/or online event that may be previously identified and/or pre-identified as a flat tire. According to one embodiment, the acoustic detection program 108A, 108B may determine the degree of similarity based on a threshold number of similarities between the captured sound and sensor data with the stored and online sound and sensor data, whereby the degree of similarity may be represented by a percentage. For example, based on a threshold number of similarities between the sound attributes and sensor data, the acoustic detection program 108A, 108B may determine that there is a 98% likelihood that the car vehicle has a flat tire, whereby the 98% may be a confidence score determined by the acoustic detection program 108A, 108B in response to the analysis and comparisons.

According to one embodiment, in response to identifying the sensor triggering event, the acoustic detection program 108A, 108B may send and display an alert to a client computer 102 and/or to a device associated with a user and/or associated with the IoT device. For example, in response to determining that there is a 98% likelihood that the car vehicle has a flat tire, the acoustic detection program 108A, 108B may send and display an alert to a screen associated with the car vehicle or IoT device (such as an in-vehicle navigational screen), and/or send an alert to a mobile device (ex. sending a text and/or notification via an app to a mobile phone and laptop) that notifies and states a user that there is a 98% chance that their car vehicle is experiencing a flat tire. The acoustic detection program 108A, 108B may additionally include in the alert the captured sound associated with the sensor triggering event (ex. a sound file such as .wav, .mp3, .wma etc.) as well as the captured sensor data associated with the sensor triggering event (ex. tire pressure measurements, axle measurements).

Then, at 208, the acoustic detection program 108A, 108B may correlate (or associate) the captured sensor data and the captured sound clips with the identified sensor triggering event and provide the correlated data as training data for a machine learning system. For example, the acoustic detection program 108A, 108B may correlate the captured sensor data and the captured sound with the identified sensor triggering event by using the training unit 128 to associate the captured sound and the captured sensor data with the identified sensor triggering event. Thus, when identifying new sensor triggering events, the acoustic detection program 108A, 108B may use the captured sound that is correlated with the sensor data to identify in the new sensor triggering events what that specific sound may mean as it relates to a sensor and the sensor data, and/or what a sensor reading may mean as it relates to that specific captured sound. More specifically for example, associating the captured sound and the captured sensor data with the identified sensor triggering event may include detecting a similar and previously identified sensor triggering event stored on the system corpus 116 and updating the system corpus, or more specifically, updating the stored file or files associated with the detected similar sensor triggering event with the captured sensor data and the captured sound of the currently identified sensor triggering event. For example, on the system corpus 116, the stored sensor and sound data associated with a sensor triggering event such as a flat tire may be updated with the recently captured sound and sensor data associated with the identified flat tire. Furthermore, according to one embodiment, the system corpus may be updated based on the confidence score associated with the identified sensor triggering event. For example, the acoustic detection program 108A, 108B may only update stored data associated with a flat tire on the system corpus if a newly identified flat tire has a confidence score above 85%. Additionally, in the case where there is no stored data associated with a similar sensor triggering event on the system corpus 116, the acoustic detection program 108A, 108B may create an entry for the identified sensor triggering event that includes that captured sensor data and sound data.

As such, the acoustic detection program 108A, 108B may use the captured sensor and sound data as training data for one or more machine learning systems in order to better analyze and identify sensor triggering events (whereby the machine learning system may be associated with the computer 102, and/or the captured sensor and sound data may be sent to another computing device). Specifically, for example, in response to detecting a second sensor triggering event, the acoustic detection program 108A, 108B may use the correlated and stored sensor and sound data to help identify the second sensor triggering event by determining whether the second sensor triggering event is similar to the sensor triggering event identified at 208. More specifically, for example, the acoustic detection program 108A, 108B may again capture sensor data as well as sound data associated with the second sensor triggering event at 204 and be able to better identify the second sensor triggering event by using the training unit 128 to compare and determine similarities (and/or similar correlations) between the captured sensor and sound data from the second sensor triggering event and the correlated sensor and sound data determined and stored at step 208.

It may be appreciated that FIGS. 1-2 provide only illustrations of one implementation and does not imply any limitations with regard to how different embodiments may be implemented. Many modifications to the depicted environments may be made based on design and implementation requirements. For example, the acoustic detection program 108A, 108B may capture additional data about a user of the IoT device and/or about the make and model of the IoT device to increase the analysis for identifying sensor triggering events. For example, the acoustic detection program 108A, 108B may capture a VIN number associated with a car vehicle to pull additional information about service records, completed recalls, accident history, driving records, etc. Similarly, in the case of an onboard sensor that plugs into a car vehicle's standard diagnostics port, the acoustic detection program 108A, 108B may capture additional data about car usage to make additional correlations with the captured sound and other factors regarding regular car usage. As a user preference, the acoustic detection program 108A, 108B may or may not share information about different users to train the system corpus 116, and personal information associated with the captured data may be encrypted or scrubbed to anonymize the data captured by the acoustic detection program 108A, 108B.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3:
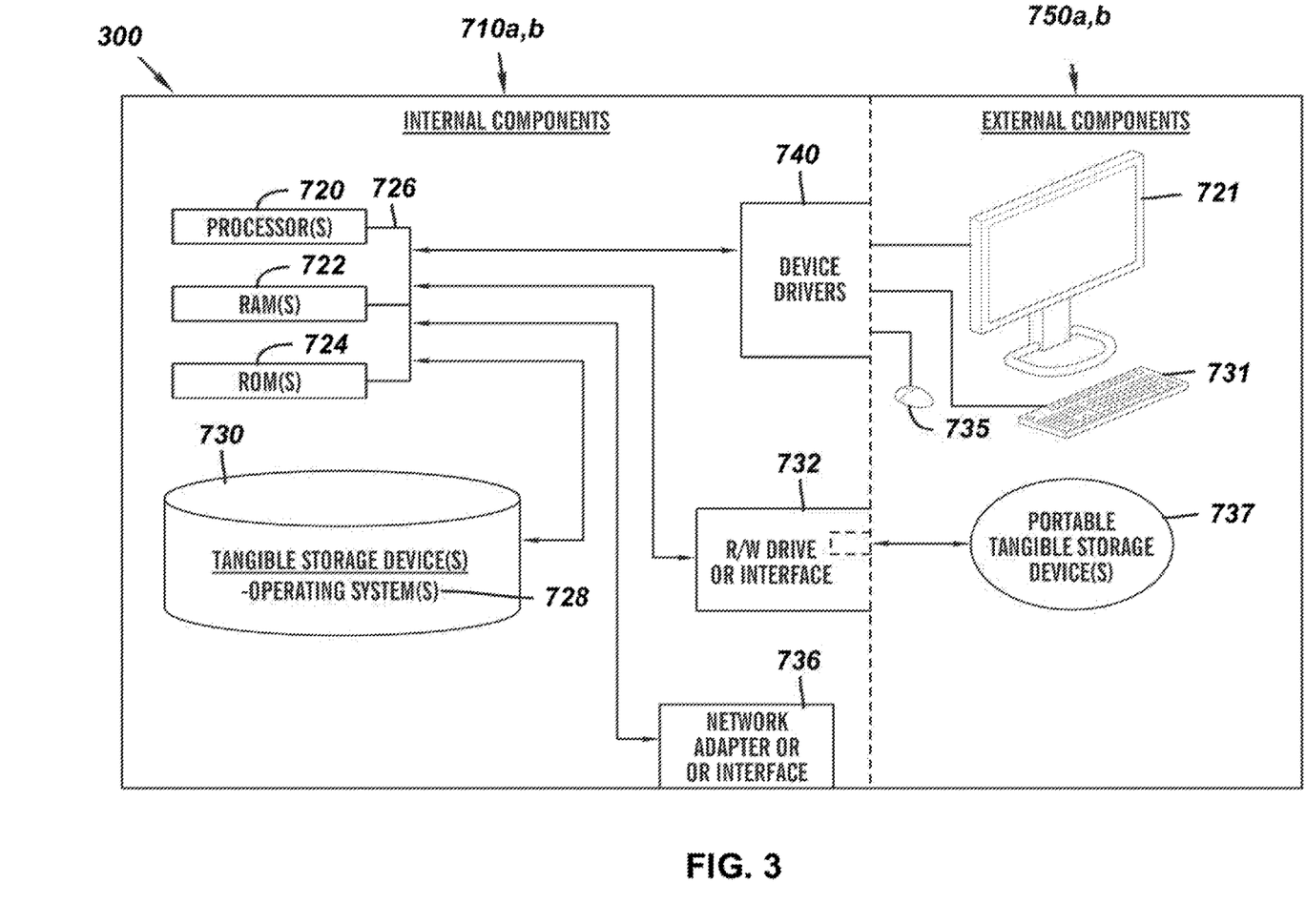
FIG. 3 is a block diagram of the system architecture of the program for automatically training a machine learning system to detect and identify a sensor triggering event associated with an internet of things (IoT) device according to one embodiment.

FIG. 3 is a block diagram 300 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 710, 750 is representative of any electronic device capable of executing machine-readable program instructions. Data processing system 710, 750 may be representative of a smart phone, a computer system, PDA, or other electronic devices. Examples of computing systems, environments, and/or configurations that may be represented by data processing system 710, 750 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 710 a, b and external components 750 a, b illustrated in FIG. 3. Each of the sets of internal components 710 a, b includes one or more processors 720, one or more computer-readable RAMs 722, and one or more computer-readable ROMs 724 on one or more buses 726, and one or more operating systems 728 and one or more computer-readable tangible storage devices 730. The one or more operating systems 728, the software program 114 (FIG. 1) and the acoustic detection program 108A (FIG. 1) in client computer 102 (FIG. 1), and the acoustic detection program 108B (FIG. 1) in network server computer 112 (FIG. 1) are stored on one or more of the respective computer-readable tangible storage devices 730 for execution by one or more of the respective processors 720 via one or more of the respective RAMs 722 (which typically include cache memory). In the embodiment illustrated in FIG. 3, each of the computer-readable tangible storage devices 730 is a magnetic disk storage device of an internal hard drive. Alternatively, each of the computer-readable tangible storage devices 730 is a semiconductor storage device such as ROM 724, EPROM, flash memory or any other computer-readable tangible storage device that can store a computer program and digital information.

Each set of internal components 710 *a, b*, also includes a R/W drive or interface 732 to read from and write to one or more portable computer-readable tangible storage devices 737 such as a CD-ROM, DVD, memory stick, magnetic tape, magnetic disk, optical disk or semiconductor storage device. A software program, such as an acoustic detection program 108A and 108B (FIG. 1), can be stored on one or more of the respective portable computer-readable tangible storage devices 737, read via the respective R/W drive or interface 732, and loaded into the respective hard drive 730.

Each set of internal components 710 *a, b* also includes network adapters or interfaces 736 such as a TCP/IP adapter cards, wireless Wi-Fi interface cards, or 3G or 4G wireless interface cards or other wired or wireless communication links. The acoustic detection program 108A (FIG. 1) and software program 114 (FIG. 1) in client computer 102 (FIG. 1), and the acoustic detection program 108B (FIG. 1) in network server 112 (FIG. 1) can be downloaded to client computer 102 (FIG. 1) from an external computer via a network (for example, the Internet, a local area network or other, wide area network) and respective network adapters or interfaces 736. From the network adapters or interfaces 736, the acoustic detection program 108A (FIG. 1) and software program 114 (FIG. 1) in client computer 102 (FIG. 1) and the acoustic detection program 108B (FIG. 1) in network server computer 112 (FIG. 1) are loaded into the respective hard drive 730. The network may comprise copper wires, optical fibers, wireless transmission, routers, firewalls, switches, gateway computers, and/or edge servers.

Each of the sets of external components 750 *a, b* can include a computer display monitor 721, a keyboard 731, and a computer mouse 735. External components 750 *a, b* can also include touch screens, virtual keyboards, touch pads, pointing devices, and other human interface devices. Each of the sets of internal components 710 *a, b* also includes device drivers 740 to interface to computer display monitor 721, keyboard 731, and computer mouse 735. The device drivers 740, R/W drive or interface 732, and network adapter or interface 736 comprise hardware and software (stored in storage device 730 and/or ROM 724).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
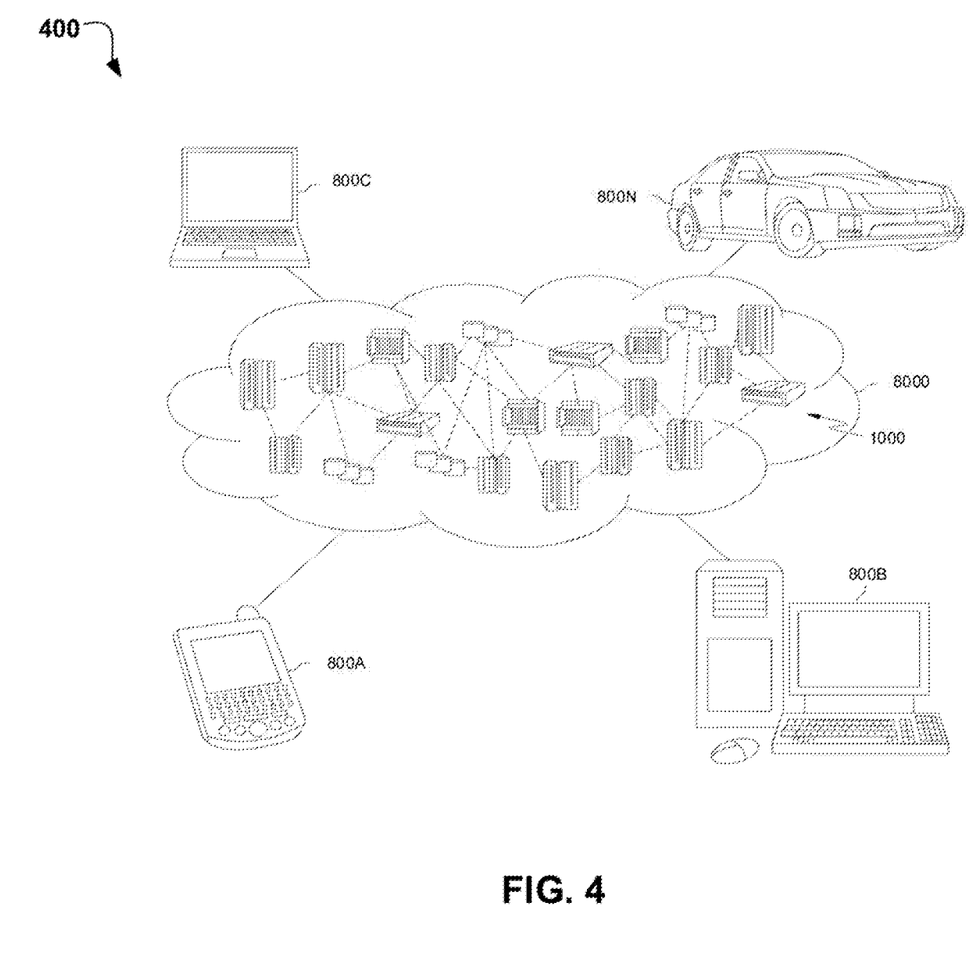
FIG. 4 is a block diagram of an illustrative cloud computing environment including the computer system depicted in FIG. 1, in accordance with an embodiment of the present disclosure.

Referring now to FIG. 4, illustrative cloud computing environment 400 is depicted. As shown, cloud computing environment 400 comprises one or more cloud computing nodes 1000 with which local computing devices used by cloud consumers, such as, for example, personal digital assistant (PDA) or cellular telephone 800A, desktop computer 800B, laptop computer 800C, and/or automobile computer system 800N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 8000 to offer infrastructure, platforms and/or software as services for which a cloud consumer does not need to maintain resources on a local computing device. It is understood that the types of computing devices 800A-N shown in FIG. 4 are intended to be illustrative only and that computing nodes 100 and cloud computing environment 8000 can communicate with any type of computerized device over any type of network and/or network addressable connection (e.g., using a web browser).

Figure 5:
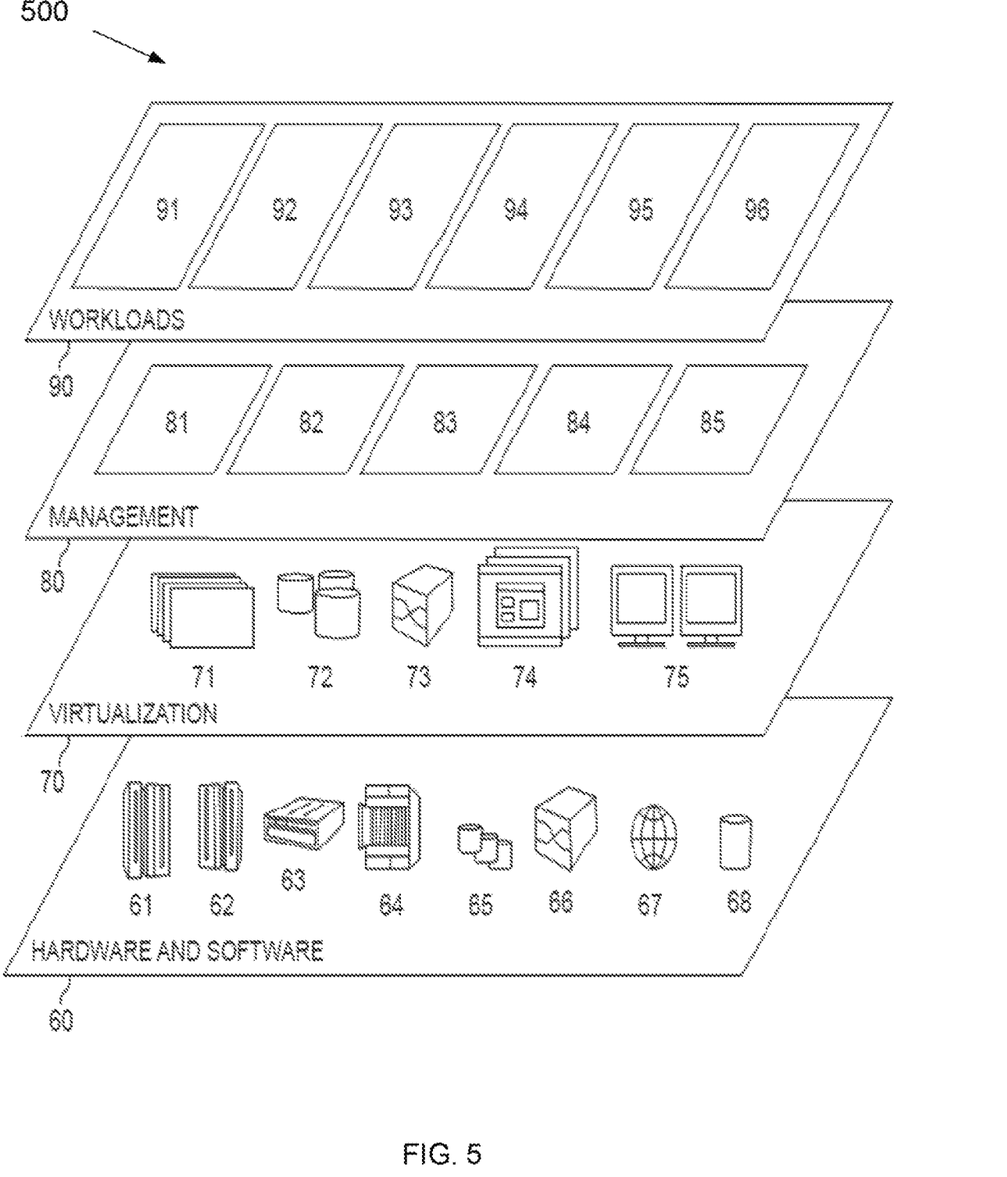
FIG. 5 is a block diagram of functional layers of the illustrative cloud computing environment of FIG. 4, in accordance with an embodiment of the present disclosure.

Referring now to FIG. 5, a set of functional abstraction layers 500 provided by cloud computing environment 800 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and acoustic detection 96. A acoustic detection program 108A, 108B (FIG. 1) may be offered "as a service in the cloud" (i.e., Software as a Service (SaaS)) for applications running on computing devices 102 (FIG. 1) and may automatically detecting and identifying a sensor triggering event associated with an IoT device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for automatically training a machine learning system to detect and identify a sensor triggering event associated with an internet of things (IoT) device, the method comprising:

in response to a first sensor triggering event, using one or more sensors associated with the sensor analysis unit to capture sensor data associated with the IoT device and using an acoustic detection device to capture one or more sound clips associated with the IoT device;

based on the captured sensor data and the captured one or more sound clips, identifying the first sensor triggering event associated with the IoT device; and correlating the captured one or more sound clips with the captured sensor data and the first identified sensor triggering event, storing the captured sensor data, the captured one or more sound clips, and the first identified sensor triggering event and providing the correlated and stored data as training data to one or more computer machine learning systems.

2. The method of claim 1, further comprising:

receiving, by the IoT device, one or more rules to control event collection by the sensor analysis unit and the acoustic detection device that is associated with the IoT device, wherein event collection includes capturing the sensor data and the one or more sound clips associated with the IoT device in response to the first sensor triggering event, and wherein the one or more rules to control event collection by the sensor analysis unit and the acoustic detection device comprise a first set of rules to determine when and how long to collect sensor data associated with the one or more sensors and to collect sound associated with the acoustic detection device in response to determining a type of the first sensor triggering event.

3. The method of claim 1, wherein using the one or more sensors associated with the sensor analysis unit to capture the sensor data further comprises: capturing the sensor data based on a second set of rules that determines whether to capture the sensor data from a first set sensors that include the one or more sensors that detected the first sensor triggering event and capturing the sensor data from a second set of different sensors.

4. The method of claim 1, wherein identifying the first sensor triggering event further comprises:
   transmitting the captured sensor data and the captured one or more sound clips to the one or more computer machine learning system according to a third set of rules based on a determination of whether the first sensor triggering event is normal or abnormal;
   determining similarities between the captured sensor data, stored sensor data, and online sensor data;
   determining similarities between the captured one or more sound clips, stored one or more sound clips, and online one or more sound clips;
   identifying the first sensor triggering event by determining that the captured sensor data and the captured one or more sound clips have a degree of similarity to stored or online data associated with a previously identified event, and identifying the previously identified event as the first sensor triggering event; and
   sending an alert comprising a notification of the first identified sensor triggering event to one or more computing devices associated with a user of the IoT device.

5. The method of claim 1, wherein identifying the first sensor triggering event further comprises:
   presenting the identified first sensor triggering event with a confidence score.

6. The method of claim 5, wherein the alert comprises the captured one or more sound clips, the captured sensor data, and the confidence score associated with the first identified sensor triggering event.

7. The method of claim 1, further comprising:
   in response to detecting a second sensor triggering event, identifying the second sensor triggering event by determining similarities between the correlated and stored data associated with the first identified sensor triggering event and additional sensor and sound data that is captured based on the second sensor triggering event.

8. A computer system for automatically training a machine learning system to detect and identify a sensor triggering event associated with an internet of things (IoT) device, comprising:
   one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
   in response to a first sensor triggering event, using one or more sensors associated with the sensor analysis unit to capture sensor data associated with the IoT device and using an acoustic detection device to capture one or more sound clips associated with the IoT device;
   based on the captured sensor data and the captured one or more sound clips, identifying the first sensor triggering event associated with the IoT device; and
   correlating the captured one or more sound clips with the captured sensor data and the first identified sensor triggering event, storing the captured sensor data, the captured one or more sound clips, and the first identified sensor triggering event and providing the correlated and stored data as training data to one or more computer machine learning systems.

9. The computer system of claim 8, further comprising:
   receiving, by the IoT device, one or more rules to control event collection by the sensor analysis unit and the acoustic detection device that is associated with the IoT device, wherein event collection includes capturing the sensor data and the one or more sound clips associated with the IoT device in response to the first sensor triggering event, and wherein the one or more rules to control event collection by the sensor analysis unit and the acoustic detection device comprise a first set of rules to determine when and how long to collect sensor data associated with the one or more sensors and to collect sound associated with the acoustic detection device in response to determining a type of the first sensor triggering event.

10. The computer system of claim 9, wherein using the one or more sensors associated with the sensor analysis unit to capture the sensor data further comprises:
    capturing the sensor data based on a second set of rules that determines whether to capture the sensor data from a first set sensors that include the one or more sensors that detected the first sensor triggering event and capturing the sensor data from a second set of different sensors.

11. The computer system of claim 8, wherein identifying the first sensor triggering event further comprises:
    transmitting the captured sensor data and the captured one or more sound clips to the one or more computer machine learning systems according to a third set of rules based on a determination of whether the first sensor triggering event is normal or abnormal;
    determining similarities between the captured sensor data, stored sensor data, and online sensor data;
    determining similarities between the captured one or more sound clips, stored one or more sound clips, and online one or more sound clips;
    identifying the first sensor triggering event by determining that the captured sensor data and the captured one or more sound clips have a degree of similarity to stored or online data associated with a previously identified event, and identifying the previously identified event as the first sensor triggering event; and
    sending an alert comprising a notification of the first identified sensor triggering event to one or more computing devices associated with a user of the IoT device.

12. The computer system of claim 8, wherein identifying the first sensor triggering event further comprises:
    presenting the identified first sensor triggering event with a confidence score.

13. The computer system of claim 12, wherein the alert comprises the captured one or more sound clips, the captured sensor data, and the confidence score associated with the first identified sensor triggering event.

14. The computer system of claim 8, further comprising:
    in response to detecting a second sensor triggering event, identifying the second sensor triggering event by determining similarities between the correlated and stored data associated with the first identified sensor triggering event and additional sensor and sound data that is captured based on the second sensor triggering event.

15. A computer program product for automatically training a machine learning system to detect and identify a sensor triggering event associated with an internet of things (IoT) device, comprising:

one or more tangible computer-readable storage devices and program instructions stored on at least one of the one or more tangible computer-readable storage devices, the program instructions executable by a processor, the program instructions comprising:

program instructions to, in response to a first sensor triggering event, use one or more sensors associated with the sensor analysis unit to capture sensor data and use an acoustic detection device to capture one or more sound clips associated with the IoT device;

program instructions to, based on the captured sensor data and the captured one or more sound clips, identify the first sensor triggering event associated with the IoT device; and program instructions to correlate the captured one or more sound clips with the captured sensor data and the first identified sensor triggering event, store the captured sensor data, the captured one or more sound clips, and the first identified sensor triggering event and providing the correlated and stored data as training data to one or more computer machine learning systems.

16. The computer program product of claim 15, further comprising:

program instructions to receive, by the IoT device, one or more rules to control event collection by the sensor analysis unit and the acoustic detection device that is associated with the IoT device, wherein event collection includes capturing the sensor data and the one or more sound clips associated with the IoT device in response to the first sensor triggering event, and wherein the one or more rules to control event collection by the sensor analysis unit and the acoustic detection device comprise a first set of rules to determine when and how long to collect sensor data associated with the one or more sensors and to collect sound associated with the acoustic detection device in response to determining a type of the first sensor triggering event.

17. The computer program product of claim 16, wherein the program instructions to use the one or more sensors associated with the sensor analysis unit to capture the sensor data further comprises:

program instructions to capture the sensor data based on a second set of rules that determines whether to capture the sensor data from a first set sensors that include the one or more sensors that detected the first sensor triggering event and capture the sensor data from a second set of different sensors.

18. The computer program product of claim 15, wherein the program instructions to identify the first sensor triggering event further comprises:

program instructions to transmit the captured sensor data and the captured one or more sound clips to the one or more computer machine learning systems according to a third set of rules based on a determination of whether the first sensor triggering event is normal or abnormal;

program instructions to determine similarities between the captured sensor data, stored sensor data, and online sensor data; and program instructions to determine similarities between the captured one or more sound clips, stored one or more sound clips, and online one or more sound clips; and program instructions to identify the first sensor triggering event by determining that the captured sensor data and the captured one or more sound clips have a degree of similarity to stored or online data associated with a previously identified event, and identifying the previously identified event as the first sensor triggering event; and program instructions to send an alert comprising a notification of the first identified sensor triggering event to one or more computing devices associated with a user of the IoT device.

19. The computer program product of claim 15, wherein the program instructions to identify the first sensor triggering event comprises:

program instructions to present the identified first sensor triggering event with a confidence score.

20. The computer program product of claim 19, wherein the alert comprises the captured one or more sound clips, the captured sensor data, and the confidence score associated with the first identified sensor triggering event.

* * * * *